USOO5265472A

United States Patent [19]
Pfeifle et al.

[11] Patent Number: 5,265,472
[45] Date of Patent: Nov. 30, 1993

[54] PROCESS FOR COMPENSATING ACCELERATION SENSOR ERRORS

[75] Inventors: Eberhard Pfeifle, Plüderhausen; Armin Müller, Backnang; Andreas Faulhaber, Weinstadt/Endersbach; Richard Zimmer, Fellbach, all of Fed. Rep. of Germany

[73] Assignee: Daimler-Benz Aktiengesellschaft, Fed. Rep. of Germany

[21] Appl. No.: 558,319

[22] Filed: Jul. 26, 1990

[30] Foreign Application Priority Data

Jul. 26, 1989 [DE] Fed. Rep. of Germany ....... 3924691

[51] Int. Cl.$^5$ .................. G01P 15/00; G01P 21/00
[52] U.S. Cl. ................................ 73/514; 73/510; 364/426.01
[58] Field of Search .......... 73/505, 510, 511, 512, 73/515, 1 R, 1 D, 514; 33/366; 364/424.01, 426.01, 566, 571.01, 571.02, 571.05, 575

[56] References Cited

U.S. PATENT DOCUMENTS

| | | | |
|---|---|---|---|
| 3,094,877 | 6/1963 | Gold | 73/517 R |
| 3,948,096 | 4/1976 | Miller | 364/566 X |
| 3,974,699 | 8/1976 | Morris et al. | 73/510 X |
| 4,038,876 | 8/1977 | Morris et al. | 73/510 X |
| 4,531,300 | 7/1985 | Heidel et al. | 73/510 X |
| 4,583,172 | 4/1986 | Furukawa et al. | 364/424.01 |
| 4,799,385 | 1/1989 | Hulsing et al. | 73/510 X |
| 5,040,115 | 8/1991 | Fukushima et al. | 364/424.01 |

Primary Examiner—Tom Noland
Assistant Examiner—Michael Brock
Attorney, Agent, or Firm—Evenson, McKeown, Edwards & Lenahan

[57] ABSTRACT

A process for compensating systematic errors of an acceleration sensor. The result of a sliding average of the output of the accelerometer, determined when acceleration in the primary measurement direction is zero, is subtracted from the output of the accelerometer thus producing a signal representative of acceleration only in the primary direction. A functional check of the accelerometer is provided by aligning the accelerometer in a second direction and comparing the acceleration measured in this second direction to the acceleration measured in the primary direction by a second device for determining acceleration and indicating a malfunction when the two measured accelerations are different and it is determined that acceleration only in the primary direction is present.

44 Claims, 2 Drawing Sheets

PROCESS FOR COMPENSATING ACCELERATION SENSOR ERRORS

BACKGROUND AND SUMMARY OF THE INVENTION

The present invention relates to a process for compensating errors of an acceleration sensor and, more particularly, to such a process for use in a vehicle for measurement of an acceleration in a defined direction.

A process for compensating acceleration sensor errors is generally known as shown in DE 3,705,932 A1. According to this process, a longitudinal-acceleration sensor is checked to determine if it is functioning and suitably calibrated when the vehicle is travelling without any wheel slip. A longitudinal acceleration of the vehicle can therefore be derived from the wheel speeds.

A disadvantage of this known process is that calibration and, if appropriate, a detection of a functional fault of an acceleration sensor is possible only when the direction of the acceleration measured by the acceleration sensor coincides with the direction of the longitudinal acceleration of the vehicle. A functional check of a transverse-acceleration sensor is therefore impossible.

Furthermore, DE 3,702,824 shows it is known to eliminate the influence of the gravitational acceleration g as a result of the occurrence of rolling angles of the vehicle in the determination of the transverse acceleration by arranging two acceleration sensors at a specific angle to one another and by evaluating their signals.

A disadvantage of this process is that two acceleration sensors have to be used in order to eliminate the influence of gravitational acceleration on the acceleration to be determined. Moreover, the acceleration sensors have to be arranged at specific angles to one another, that is to say inaccuracies in respect of these angles cannot be detected in this known process.

It is likewise known from DE 3,627,241 A1 to check the functional capacity of an acceleration sensor by applying a test signal to the acceleration sensor and by comparing the output signal thereby obtained with a desired trend for this output signal.

A disadvantage of this test signal process is that only the electrical transmission of the acceleration sensor can be checked by a test signal. If, for example on a seismic acceleration sensor, a fault occurs as a result of catching of the mass to be accelerated, this fault cannot be detected by applying a test signal. In carrying out this process, it is at most conceivable to cause a specific force to act on the mass, so that a functional check of the acceleration sensor can thus be conducted by comparing the output signal obtained from the acceleration sensor with the desired value of the output signal of the acceleration sensor which should be obtained in response to an acceleration corresponding to the specific force. However, the disadvantage of such a process is that functional check would involve a relatively high outlay.

An object of the present invention is to detect a functional fault of a defective acceleration sensor and/or to detect and compensate differences, occurring during installation or after a lengthy operating period, between the direction of the acceleration to be measured in the direction $R_{def}$ and the direction of the acceleration which is sensed by the sensor.

According to the present invention, in a process for compensating errors of an acceleration sensor, this object is achieved by a process in which part of an output signal $A_B$ of the acceleration sensor, based on the acceleration $a_{dif1}$ in a direction $R_{dif1}$ differing from a defined direction $R_{def}$ of the acceleration $a_{def}$ to be measured, is detected by subjecting the output signal $A_B$ of the acceleration sensor to a sliding average method when it is concluded from general driving conditions of the vehicle that the acceleration $a_{def}$ in the defined direction $R_{def}$ must momentarily be equal to zero. A signal $S_B$ of the acceleration sensor is generated from the output signal $A_B$ of the acceleration sensor by subtracting the result RES of the sliding average method from the output signal $A_B$ of the acceleration sensor, in order to arrive at the signal $S_B$ of the acceleration sensor representing the acceleration $a_{def}$ in the defined direction $R_{def}$. A functional check of the acceleration sensor can be conducted by basing at least part of the output signal $A_B$ of the acceleration sensor on an acceleration $a_{dif2}$ in a direction $R_{dif2}$ which is determined by at least one further device for the determination of the acceleration $a_{dif2}$ in this direction $R_{dif2}$. The output signal $A_B$ or, if appropriate, the signal $S_B$ of the acceleration sensor is compared with the determined value of the acceleration $a_{dif2}$ in this direction $R_{dif2}$, and a functional fault of the acceleration sensor is concluded from a deviation when it is derived from general driving situations that only an acceleration $a_{dif2}$ in this direction $R_{dif2}$ acts on the acceleration sensor.

Advantages of the present invention over conventional processes are that no further acceleration sensor is required to compensate for directional errors of the acceleration sensor. The detection of a functional fault of the acceleration sensor is now possible in an especially advantageous way in a vehicle with an anti-lock system (ABS) and/or a drive-slip control (ASR). In these systems, a value for the vehicle acceleration is determined from the wheel speeds. This value can then be used advantageously for the functional check of the acceleration sensor. If deviations of the determined longitudinal accelerations of the vehicle between the value of the acceleration sensor and the value determined from the wheel speeds are found, it can be concluded with high probability that there is a functional fault of the acceleration sensor by virtue of the redundancy of the ABS or ASR signals provided for safety purposes.

In order to determine the acceleration of a vehicle in a particular direction, an acceleration sensor is mounted in such a way that it measures the acceleration $a_{def}$ in the defined direction $R_{def}$. If this direction $R_{def}$ of the acceleration $a_{def}$ to be measured is in the horizontal plane, the output signal $A_B$ of the acceleration sensor can differ from the expected output signal $A_B$ in response to the acceleration $a_{def}$ to be measured, when the direction $R_{def}$ of the acceleration $a_{def}$ measured by the acceleration sensor is inclined at an angle $\beta$ relative to the horizontal plane. The deviation of the output signal $A_B$ from the expected output signal $A_B$ is based on the gravitational acceleration g in the vertical direction which contributes the acceleration $B_{ver}$ of $(g^*\sin\beta)$ to the output signal $A_B$. This contribution $B_{ver}$ in the output signal $A_B$ is always present; that is to say, when the vehicle is travelling without acceleration, this contribution $B_{ver}$ makes up the entire output signal $A_B$, whereas, when the vehicle is travelling with acceleration, part of the output signal $A_B$ is based on the accelerated travel of the vehicle, and another part of the output signal $A_B$ is based on the contribution $B_{ver}$.

On the other hand, this angle $\beta$ can also come about because the acceleration sensor is installed inexactly in its position, and, on the other hand, the acceleration sensor can change its position during operation. Moreover, the angle $\beta \neq 0$ can occur when the vehicle is on a stretch with a gradient or a lateral inclination.

In principle, as regards an individual output signal $A_B$ of the acceleration sensor in an unaccelerated driving state of the vehicle, it is not possible to distinguish whether an angle $\beta \neq 0$ comes about because the acceleration sensor is inclined relative to the horizontal plane of the vehicle or because the vehicle and, therefore, also the acceleration sensor have an inclination relative to the horizontal plane. In the process according to the present invention for compensating errors of an acceleration sensor the output signals $A_B$ of the acceleration sensor in an unaccelerated driving state are therefore subjected to a sliding average method, in order to filter brief fluctuations of the output signal $A_B$ of the acceleration sensor in the unaccelerated driving state (based on a gradient or lateral road inclination) and to obtain the fraction of the output signal $A_B$ of the acceleration sensor which is based on an inclination of the acceleration sensor relative to the horizontal plane of the vehicle. Subtraction of the result RES of the sliding average method from the momentarily measured acceleration $a_{def}$ of the acceleration sensor then produces the momentary acceleration in the defined direction $R_{def}$ in relation to the horizontal plane of the vehicle.

In order to avoid fluctuations possibly occurring in the result RES of the sliding average method, it is possible for output signals $A_B$ of the acceleration sensor not to be included in the sliding average method, even if there is an unaccelerated driving state, when the output signals $A_B$ have a difference greater than a predetermined threshold value SW in relation to the result RES of the sliding average method. With an increasing gradient, the acceleration $a_{def}$ measured by the acceleration sensor increases in an unaccelerated driving state. When a threshold value SW for taking into account the output signals of the acceleration sensor is used in carrying out the sliding average method, gradients or lateral inclinations of the road therefore remain neglected above a threshold S obtained from this threshold value SW. The threshold value SW is appropriately selected to be of such an order of magnitude that the threshold value SW is exceeded above a gradient or lateral road inclination of approximately 1° to 2°.

It is also possible to cancel the process according to the present invention for a specific period of time when the vehicle is travelling along a stretch with a gradient above the threshold value SW. The gradient of the stretch covered by the vehicle can be obtained in a way known per se from the engine torque of the vehicle and from the transmission ratio of the engine speed to the wheel speed.

Since a gradient or lateral inclination of the road influences the output signal $A_B$ of the acceleration sensor, it is advantageous to take these factors into account when they have only slight momentary fluctuations. For example, when the vehicle is travelling along a road through a pass, it covers a relatively long stretch uphill or downhill. If the process according to the invention is carried out with the use of a threshold value SW for taking into account output signals $A_B$ of the acceleration sensor, there can therefore be no updating of the value of the sliding average method during the uphill or downhill travel, as long as the road inclination is above the threshold S leading to an output signal $A_B$ of the acceleration sensor which has a difference above the threshold value from the momentarily valid result RES of the sliding average method.

A gradient or a lateral inclination of the road can be taken into account by also taking into account in a sliding average method, in an unaccelerated driving state, output signals $A_B$ of the acceleration sensor, of which the difference from the result RES of the sliding average method is above the threshold value SW. To avoid taking into account output signals $A_B$ of the acceleration sensor, of which the difference from the result RES of the sliding average method is above the threshold value SW and which are based on only brief fluctuations, output signals $A_B$ of the acceleration sensor, of which the difference from the result RES of the sliding average method is above the threshold value SW, are taken into account only when these output signals $A_B$ occur uninterruptedly in a specific frequency $Z_{max}$. When, in carrying out the process according to the invention, it is ascertained from the frequency Z of the occurring output signals $A_B$ of the acceleration sensor, of which the difference from the result RES of the sliding average method is above the threshold value SW, that the vehicle is on a stretch of virtually constant gradient or inclination, a more rapid adaptation of the result of the sliding average method can be obtained if the output signals $A_B$ of the acceleration sensor are included in the sliding average method with an increasing weighting. The increase in the weighting of the output signals $A_B$ of the acceleration sensor when the sliding average method is carried out can here take place linearly or progressively.

The state of unaccelerated travel of the vehicle can be derived in an especially advantageous way when the vehicle speed $V_F$ is equal to zero and the output signal of the acceleration sensor has no time change.

If a further device for the determination of the acceleration $a_{dif2}$ in a direction $R_{dif2}$ is present on the vehicle, a functional check of the acceleration sensor is possible when the projection of the acceleration $a_{def}$ in the defined direction $R_{def}$, measured by the acceleration sensor, onto the direction $R_{dif2}$ is not equal to zero and when the acceleration $a_{def}$ in the direction $R_{def}$, as measured by the acceleration sensor, has no acceleration in a direction not equal to $R_{dif2}$. Thus, the functioning of a transverse-acceleration sensor can be checked in an especially advantageous way when an anti-lock system (ABS) and/or a drive-slip control (ASR) are present on the vehicle. The vehicle acceleration $a_1$ in the longitudinal direction of the vehicle, corresponding to the direction $R_{dif2}$, is determined by the ABS or the ASR. When the transverse acceleration sensor is now rotated through a specific angle $\mu$, e.g. about 30°, out of the direction transverse relative to the longitudinal axis of the vehicle into the direction of the longitudinal axis of the vehicle, the output signal $A_B$ of the acceleration sensor, representing the acceleration $a_{def}$ in the defined direction $R_{def}$, is determined by the longitudinal acceleration of the vehicle $a_a$, corresponding to the acceleration in the direction $R_{dif2}$, and the transverse acceleration of the vehicle $a_q$, corresponding to the acceleration in the direction $R_{dif3}$, according to the formula:

$$a_{def} = a_1 \cdot \sin(\mu) + a_q \cdot \cos(\mu)$$

Thus, the transverse acceleration of the vehicle $a_q$ is obtained from the vehicle speed $V_F$ and the radius of curvature R of the bend as:

$$a_q = \frac{v_F^2}{R}$$

When it is concluded from the general driving situation that there is no transverse acceleration of the vehicle $a_q$, that is to say the vehicle is not travelling round a bend, that output signal of the acceleration sensor representing the acceleration $a_{def}$ is produced solely by the longitudinal acceleration of the vehicle $a_1$. This means that the longitudinal acceleration of the vehicle $a_1$ determined by the ABS or by the ASR must be equal to the acceleration $a_{def}$ measured by the acceleration sensor, divided by the factor $\sin(\mu)$. The transverse acceleration of the vehicle $a_q$ is then obtained by substituting the above equation as:

$$a_q = \frac{a_{def} - a_1 * \sin(\mu)}{\cos(\mu)}$$

The process according to the present invention for a functional check of the acceleration sensor is carried out when the vehicle is travelling in a straight line. Travel in a straight line can be detected from the steering angle of the steered wheels of the vehicle or from the steering-wheel angle of the vehicle. The process according to the invention is carried out when these angles are equal to zero.

Alternatively, a travel of the vehicle on a bend can be detected by a comparison of the time derivations of the determined longitudinal acceleration of the vehicle $a_1$ and of the measured acceleration $a_{def}$. If the vehicle is travelling on a bend, with a constant radius of curvature R of the bend, the transverse acceleration of the vehicle $a_q$ changes as a result of the changing vehicle speed $v_F$. The time change $A_3$ of the transverse acceleration of the vehicle $a_q$ therefore depends on the vehicle speed $v_F$ and on the radius of curvature R of the bend, according to the relation:

$$A_3 = \frac{2 * v_F * a_1 * R - R' * v_F}{R^2}$$

R' being the time derivation of the radius of curvature R of the bend. In straight line travel, the time change of the longitudinal acceleration of the vehicle $a_1$ is directly proportional to the time change of the measured acceleration $a_{def}$. The proportionality constant is here predetermined at $\sin(\mu)$ by the geometry of the arrangement of the acceleration sensor. During travel on a bend, with a time change of the longitudinal acceleration of the vehicle $a_1$, there is a time change of the transverse acceleration $a_q$ which, in general, is not proportional to the longitudinal acceleration of the vehicle $a_1$. This proportionality is present only when the time change R' of the radius of curvature R of the bend disappears. In this instance however, the proportionality factor still depends on the vehicle speed $v_F$ and on the radius of curvature R of the bend.

This affords the possibility of detecting a travel on a bend by determining and storing the quotient $Q_{str}$, resulting from the geometry, from the time change $a_1$ and the time change $A_2$ during travel in a straight line. This quotient $Q_{str}$ is compared with the particular quotient $Q_{cur}$ determined from the current operating conditions when at least one of the time changes of the longitudinal acceleration of the vehicle $a_1$ and/or of the measures acceleration $a_{def}$ in the defined direction $R_{def}$ does not disappear. Travel on a bend is concluded from a deviation of the quotient $Q_{str}$ from the quotient $Q_{cur}$.

BRIEF DESCRIPTION OF THE DRAWINGS

These and other objects, features and advantages of the present invention will become more apparent from the following detailed description of the presently preferred embodiment of the present invention when taken in conjunction with the accompanying drawings wherein.

DETAILED DESCRIPTION OF THE DRAWINGS

Figure 1:
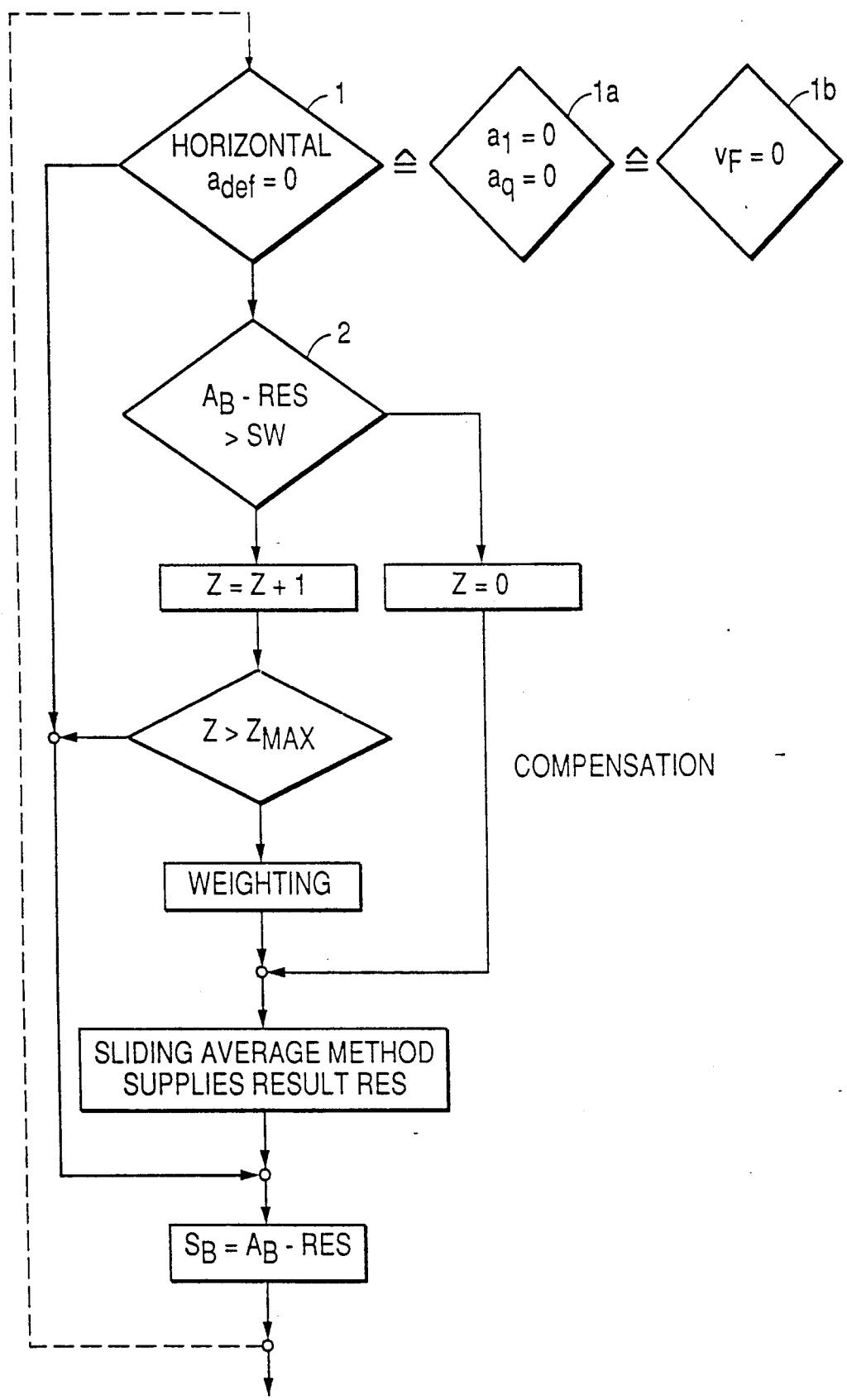
FIG. 1 is a flow chart of a portion of the process according to the present invention for compensating errors of an acceleration sensor.

As is shown in functional block 1 of FIG. 1, a check is first made by reference to the general driving conditions, as to whether the value "zero" is expected for acceleration $a_{def}$ in the defined direction $R_{def}$. This defined direction $R_{def}$ here lies in the horizontal plane of the vehicle. These general driving conditions are shown in functional block 1a that the acceleration $a_1$ in the longitudinal direction of the vehicle and the acceleration $a_q$ in the transverse direction of the vehicle are equal to zero. Alternatively, these driving conditions can be determined as shown in functional block 1b from the fact that the vehicle speed $v_F$ is equal to zero.

A check can subsequently be made as shown in functional block 2 as to whether the output signal $A_B$ of the acceleration sensor exceeds a predetermined threshold value SW. Brief disturbances as a result only of a short-lived gradient or inclination of the road are ignored. This check can be conducted at least partially by analog means, for example by carrying out a check from the engine torque and the transmission ratio of the engine speed to the wheel speed, of the gradient of the stretch on which the vehicle is located, as to whether it exceeds a predetermined threshold SW.

From a specific frequency $Z_{max}$ of uninterruptedly occurring output signals $A_B$, of which the difference from the momentarily valid result RES of the sliding average method is above the threshold value SW, it can be derived that the vehicle is located on a stretch with an at least virtually constant gradient or lateral inclination. If a virtually constant gradient or lateral inclination is to be taken into account in the process according to the present invention for compensating errors of an acceleration sensor, from a specific frequency $Z_{max}$ of the occurring output signals $A_B$ of the acceleration sensor above the threshold value SW, the process according to the present invention takes these output signals $A_B$ into account. The frequency Z is determined by incrementing a counter Z whenever there occurs an output signal $A_B$, of which the difference from the momentarily valid result RES of the sliding average method is above the threshold value SW. If this counter Z exceeds a predetermined maximum value $Z_{max}$, the following output signals $A_B$ are taken in account, advantageously with an increasing weighting, when the process according to the present invention is carried out.

If the output signal $A_B$ of the acceleration sensor is below the predetermined threshold value SW, the counter Z of the frequency of the uninterruptedly successively occurring output signals $A_B$ of the acceleration sensor, of which the difference from the momentarily valid result of the sliding average method is above the threshold value SW, is standardized.

Subsequently, the sliding average method is carried out in a known way by summing the appropriate number of values, dividing by the number of summed values and thereafter erasing from the memory the oldest value of that output signal $A_B$ of the acceleration sensor to be taken into account.

A signal $S_B$ representing the acceleration $a_{def}$ in the defined direction $R_{def}$ is then obtained from the output signal $A_B$ of the acceleration sensor by subtracting the result RES of the sliding average method from the output signal $A_B$ of the acceleration sensor.

Figure 2:
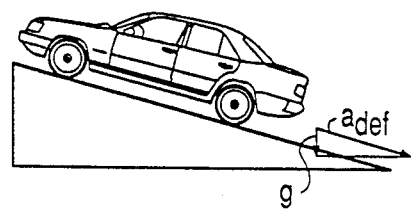
FIG. 2 is an example of the use of the process according to the present invention in a motor vehicle.

FIG. 2 shows the influence of the gravitational acceleration g on the output signal $A_B$ of an acceleration sensor for measuring the acceleration $a_{def}$ in the horizontal plane of a vehicle. This influence can be compensated by the process illustrated in FIG. 1.

Figure 5:
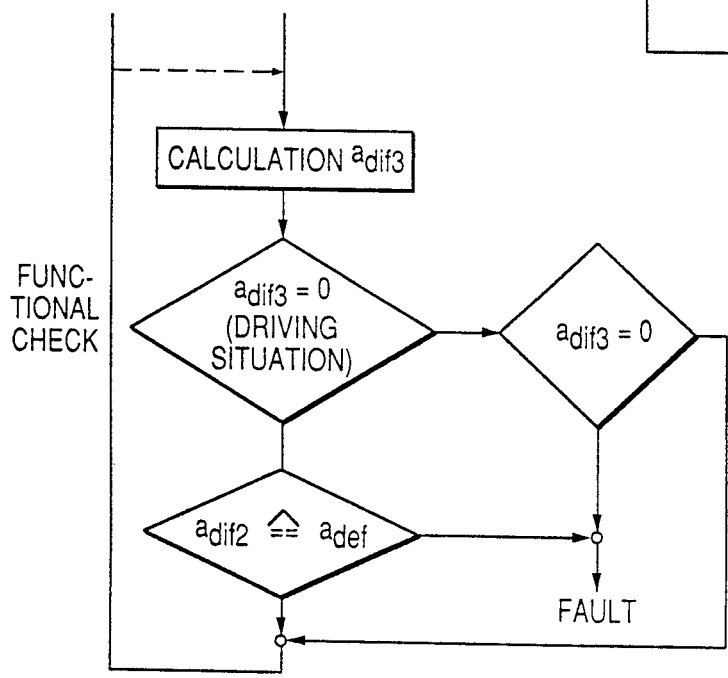
FIG. 5 is a schematic drawing of a device for carrying out the process according to the present invention for the functional check of an acceleration sensor.

A functional check of an acceleration sensor can be conducted by the process flow shown in FIG. 5. For this, the acceleration sensor is mounted in such a way that part of its output signal $A_B$, representing acceleration $a_{def}$ in the direction $R_{def}$, is based on an acceleration $a_{def}$ determined by another device. Any acceleration in the plane covered by the two accelerations $a_{dif2}$ and $a_{def}$ can be calculated from this by vectorial addition in a known way.

Figure 3:
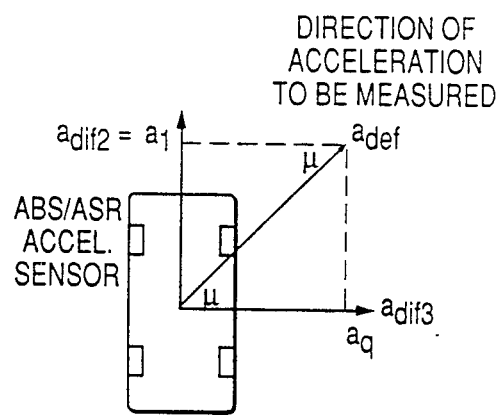
FIG. 3 is a process flow chart for an arrangement which determines the acceleration of a motor vehicle with a simultaneous functional check of an acceleration sensor.

FIG. 3 illustrates such an arrangement in which the acceleration sensor is mounted in such a way that part of its output signal is based on the acceleration $a_1$ (corresponding to $a_{def2}$) in the longitudinal direction of the vehicle. This acceleration $a_1$ (corresponding to $a_{dif2}$) in the longitudinal direction of the vehicle is determined by a separate device for the determination of the longitudinal acceleration of the vehicle $a_1$ (corresponding to $a_{dif2}$). If speed sensors are present on the vehicle, this acceleration $a_1$ (corresponding to $a_{dif2}$) in the longitudinal direction of the vehicle can be derived from these speed signals in an especially advantageous way. In the arrangement shown in FIG. 3, the transverse acceleration of the vehicle $a_q$ (corresponding to $a_{dif3}$) is calculated from the accelerations $a_1$ (corresponding to $a_{dif2}$) and $a_{def}$.

According to the process flow of FIG. 5, the acceleration $a_{dif3}$ is calculated first. Subsequently, a functional check of the acceleration sensor is conducted. If it is concluded from the general driving situation that the acceleration $a_{dif3}$ must be equal to zero, a comparison of the determined acceleration $a_{dif2}$ with the output signal $A_B$ or signal $S_B$ of the acceleration sensor is carried out, and the output signal $A_B$ or the signal $S_B$ must correspond to the determined acceleration $a_{dif2}$ under the condition "$a_{dif3}$ equal to zero". If there is a deviation, it is concluded that there is a functional fault of the acceleration sensor.

If it is concluded from the general driving situation that the acceleration $a_{dif3}$ must not be equal to zero, the calculated value of the acceleration $a_{dif3}$ is checked. If this calculated value of the acceleration $a_{dif3}$ then has the value "zero", it is concluded that there is a functional fault of the acceleration sensor.

Should this acceleration $a_{dif3}$ correspond to the transverse acceleration of the vehicle $a_q$, the general driving situations, from which it is concluded that there is the condition "$a_q$ equal to zero", can correspond to the condition "steering angle equal to zero".

Figure 4:
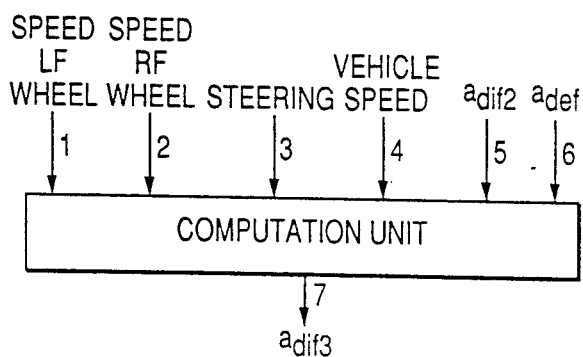
FIG. 4 is a diagrammatic representation of a device for carrying out the process according to the present invention.

FIG. 4 illustrates a device for carrying out the process according to the present invention, to which is fed a combination of a plurality of the signals representing the following quantities:

Signal 1: Speed of the left front wheel
Signal 2: Speed of the right front wheel
Signal 3: Steering angle
Signal 4: Vehicle speed
Signal 5: Acceleration $a_{dif2}$
Signal 6: Acceleration $a_{def}$ A signal 7 representing the acceleration $a_{dif3}$ is generated from these in the device.

An exemplary embodiment of the process according to the present invention for compensating errors of an acceleration sensor in a vehicle is given below. In this exemplary embodiment, the transverse acceleration of the vehicle $a_q$ is to be calculated. First, the compensation of the influence of gravitational acceleration g in the calculation of the transverse acceleration of the vehicle $a_q$ is carried out. If the vehicle speed $v_F$ is equal to zero, it is derived from this that the acceleration $a_{def}$ in the defined direction $R_{def}$ must be equal to zero. In this case, the output signal $A_B$ of the acceleration sensor is checked as to whether the difference between the output signal $A_B$ and the result RES of the sliding average method exceeds a predetermined threshold value SW. If this difference exceeds the threshold value SW, the output signal $A_B$ of the acceleration sensor is not taken in account in the sliding average method, unless a specific frequency $Z_{max}$ of preceding output signals $A_B$ in an uninterrupted sequence has exceeded a difference, e.g. approximately 10% of the number of output signals $A_B$ of the acceleration sensor, from the result RES of the sliding average method above the threshold value. In order then to obtain a rapid compensation of this obviously systematic disturbance of the output signal $A_B$, from this output signal $A_B$ all the following output signals having a difference from the momentarily valid result RES of the sliding average method above the threshold value SW are taken into account in the sliding average method with a greater weighting, and this weighting can increase progressively, but must always have an upper limit value. The sliding average method is thereafter carried out in a known way by calculating the average value of the last output signals under the condition "$a_{def}$ equal to zero" as the result of the sliding average method. This result RES of the sliding average method is subsequently subtracted from the output signal $A_B$ of the acceleration sensor, in order to arrive at the signal $S_B$ of the acceleration sensor which represents the acceleration in the direction $R_{def}$ related to the horizontal plane of the vehicle.

The transverse acceleration of the vehicle $a_q$ is calculated from this signal $S_B$ of the acceleration sensor by the determined longitudinal acceleration of the vehicle $a_1$ and the geometry of the arrangement of the acceleration sensor. A functional check of the acceleration sensor is subsequently conducted according to the process of FIG. 5. If it is derived, for example from the steering angle, that the vehicle should have no transverse acceleration of the vehicle $a_q$ in view of the general driving situation, the signal of the acceleration sensor is compared with the determined acceleration $a_1$ in the longitudinal direction of the vehicle. If a deviation is then obtained, it is concluded that there is a functional fault of the acceleration sensor. In contrast, if it is detected that the vehicle must have a transverse acceleration $a_q$ and the signal $S_B$ of the acceleration sensor is equal to zero, a functional fault of the acceleration sensor is likewise detected.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for compensating errors of a vehicle acceleration sensor and determining if a vehicle acceleration sensor for the measurement of an acceleration in a defined direction of a vehicle is functioning, comprising the steps of using at least one of a sliding average method and a functional check method, wherein the sliding average method includes subjecting an output signal of the acceleration sensor to a sliding average when it is concluded from general driving conditions of the vehicle that the acceleration to be measured in the defined direction must momentarily be equal to zero to detect part of the output signal of the acceleration sensor based on an acceleration in a direction differing from the defined direction of the acceleration to be measured, generating a signal of the acceleration sensor from the output signal of the acceleration sensor by subtracting a result of the sliding average from the output signal of the acceleration sensor in order to arrive at the signal of the acceleration sensor representing the acceleration to be measured in the defined direction, using the generated signal in lieu of the output signal, and the functional check method includes conducting a functional check of the acceleration sensor by basing part of the output signal of the acceleration sensor on an acceleration in a direction which is the same as the measurement direction of at least one further device for the determination of the acceleration in an at-least-one-further-device-determined direction, the output signal of the acceleration sensor being compared with the determined value of the acceleration in the at-least-one-further-device-determined direction, and determining the existence of a functional fault of the acceleration sensor from a deviation when it is derived from general driving situations that only an acceleration in the at-least-one-further-device-determined direction acts on the acceleration sensor.

2. The process according to claim 1, wherein the defined direction of the measured acceleration lies in a horizontal plane of the vehicle.

3. The process according to claim 1, wherein the acceleration in the direction differing from the defined direction is the acceleration in the vertical direction caused by gravitational acceleration.

4. The process according to claim 3, wherein the general driving conditions, from which it is concluded that the measured acceleration in the defined direction must momentarily be equal to zero, correspond to the general driving conditions that the vehicle has zero longitudinal acceleration and transverse acceleration, or zero vehicle speed.

5. The process according to claim 3, wherein output signals of the acceleration sensor which differ from a momentarily valid result of the sliding average method by an amount above a threshold value are used to determined the sliding average by the sliding average method when the output signals are generated in a predetermined frequency.

6. The process according to claim 5, wherein the general driving conditions, from which it is concluded that the measured acceleration in the defined direction must momentarily be equal to zero, correspond to the general driving conditions that the vehicle has zero longitudinal acceleration and transverse acceleration, or zero vehicle speed.

7. The process according to claim 6, in which an output signal is excluded from a sliding average determined by the sliding average method when a difference between the output signal and the sliding average is above a predeterminable threshold value, even when it is concluded from the general driving conditions that the measured acceleration in the defined direction must momentarily be equal to zero, and deriving, from the threshold value for the acceleration, a threshold for at least one of gradient and lateral inclination so as to take the gradient and lateral inclination into account with respect to the output signal.

8. The process according to claim 7, including the further step of interrupting the sliding average method for a specific period of time when the vehicle is travelling along a stretch with a gradient and/or lateral inclination which is above the threshold of the gradient and/or lateral inclination.

9. The process according to claim 8, including the further step of deriving the gradient from the engine torque of the vehicle and from the transmission ratio of the engine speed to the wheel speed.

10. The process according to claim 9, wherein the defined direction of the measured acceleration lies in a horizontal plane of the vehicle.

11. The process according to claim 5, wherein the specific frequency of occurrence of the output signals which differ from the momentarily valid result of the sliding average method by the amount of the difference above the threshold value is determined on the basis that the frequency of the output signals of the acceleration sensor which are above the threshold value amounts to approximately 10% of the number of output signals of the acceleration sensor to be taken into account in the sliding average method.

12. The process according to claim 5, wherein the output signals of the acceleration sensor which differ from the momentarily valid result of the sliding average method by the amount of the difference above the threshold value are given increasing weight in the sliding average method.

13. The process according to claim 12, wherein the specific frequency of occurrence of the output signals which differ from the momentarily valid result of the sliding average method by the amount of the difference above the threshold value is determined on the basis that the frequency of the output signals of the acceleration sensor which are above the threshold value amounts to approximately 10% of the number of output signals of the acceleration sensor to be taken into account in the sliding average method.

14. The process according to claim 12, wherein the increasing weight in the sliding average method given to the output signals of the acceleration sensor which differ from the momentarily valid result of the sliding average method by the amount of the difference above the threshold value is a linear increasing weight.

15. The process according to claim 12, wherein the increasing weight in the sliding average method given to the output signals of the acceleration sensor which differ from the momentarily valid result of the sliding average method by the amount of the difference above the threshold value is a progressively increasing weight.

16. The process according to claim 15, wherein the output signals of the acceleration sensor which differ from the momentarily valid result of the sliding average method by the amount of the difference above the threshold value are given increasing weight in the sliding average method.

17. The process according to claim 3, wherein the defined direction of the measured acceleration lies in a horizontal plane of the vehicle.

18. The process according to claim 1, in which an output signal is excluded from a sliding average determined by the sliding average method when a difference between the output signal and the sliding average is above a predeterminable threshold value, even when it is concluded from the general driving conditions that the measured acceleration in the defined direction must momentarily be equal to zero, and deriving, from the threshold value for the acceleration, a threshold for at least one of gradient and lateral inclination so as to take the gradient and lateral inclination into account with respect to the output signal.

19. The process according to claim 18, wherein the general driving conditions, from which it is concluded that the measured acceleration in the defined direction must momentarily be equal to zero, correspond to the general driving conditions that the vehicle has zero longitudinal acceleration and transverse acceleration, or zero vehicle speed.

20. The process according to claim 18, including the further step of interrupting the sliding average method for a specific period of time when the vehicle is travelling along a stretch with at least one of a gradient and lateral inclination which is above the threshold of the at least one of the gradient and lateral inclination.

21. The process according to claim 20, including the further step of deriving the gradient from the engine torque of the vehicle and from the transmission ratio of the engine speed to the wheel speed.

22. The process according to claim 1, including the step of determining, from one of the output signal in the case of the functional check method and the signal of the acceleration sensor which represents the measured acceleration in the defined direction in the case of the sliding average method, an acceleration in a third direction differing from the defined direction in such a way that the vectorial addition of the acceleration in the a third differing direction and of the acceleration in the at least-one-further-device-determined direction produces precisely the measured acceleration in the defined direction.

23. The process according to claim 22, wherein the defined direction of the measured acceleration lies in a horizontal plane of the vehicle.

24. The process according to claim 23, wherein the acceleration in the direction differing from the defined direction is the acceleration in the vertical direction caused by gravitational acceleration.

25. The process according to claim 24, wherein the general driving conditions, from which it is concluded that the measured acceleration in the defined direction must momentarily be equal to zero, correspond to the general driving conditions that the vehicle has zero longitudinal acceleration and transverse acceleration, or zero vehicle speed.

26. The process according to claim 25, in which an output signal is excluded from a sliding average determined by the sliding average method when a difference between the output signal and the sliding average is above a predeterminable threshold value, even when it is concluded from the general driving conditions that the measured acceleration in the defined direction must momentarily be equal to zero, and deriving, from the threshold value for the acceleration, a threshold for at least one of gradient and lateral inclination so as to take the gradient and lateral inclination into account with respect to the output signal.

27. The process according to claim 26, including the further step of interrupting the sliding average method for a specific period of time when the vehicle is travelling along a stretch with a gradient and/or lateral inclination which is above the threshold of the gradient and/or lateral inclination.

28. The process according to claim 27, including the further step of deriving the gradient from the engine torque of the vehicle and from the transmission ratio of the engine speed to the wheel speed.

29. The process according to claim 28, wherein output signals of the acceleration sensor which differ from a momentarily valid result of the sliding average method by an amount above a threshold value are used to determined the sliding average by the sliding average method when the output signals are generated in a predetermined frequency.

30. The process according to claim 29, wherein the specific frequency of occurrence of the output signals which differ from the momentarily valid result of the sliding average method by the amount of the difference above the threshold value is determined on the basis that the frequency of the output signals of the acceleration sensor which are above the threshold value amounts to approximately 10% of the number of output signals of the acceleration sensor to be taken into account in the sliding average method.

31. The process according to claim 22, further including the step, in a vehicle where an acceleration sensor is used for determining the acceleration in the third differing direction which is a direction transverse relative to a longitudinal direction of the vehicle, of mounting the acceleration sensor in such a way that part of its output signal represents the acceleration in the longitudinal direction of the vehicle which is determined by the at least one further device for the determination of the acceleration, the direction in the longitudinal direction of the vehicle corresponding to the at-least-one-further-device-determined direction, and the direction of the measured acceleration, represented by one of the signal or output signal of the acceleration sensor, corresponding to the defined direction.

32. The process according to claim 31, wherein the defined direction of the acceleration to be measured by the acceleration sensor is at an angle of about 30° relative to the direction transverse relative to the longitudinal direction of the vehicle toward the longitudinal axis of the vehicle.

33. The process according to claim 31, wherein the at least one further device for the determination of the acceleration of the vehicle in the direction corresponding to the longitudinal direction of the vehicle is operatively configured in such that the acceleration in the at-least-one-further-device determined direction is determined from the speeds of at least one vehicle wheel.

34. The process according to claim 33, wherein the defined direction of the acceleration to be measured by the acceleration sensor is at an angle of about 30° relative to the direction transverse relative to the longitudinal direction of the vehicle toward the longitudinal axis of the vehicle.

35. The process according to claim 33, including the step of concluding, when travel on a bend is detected, that there is a functional fault of the acceleration sensor when the calculated acceleration in the third direction gives the value zero.

36. The process according to claim 33, wherein the step of conducting the functional check of the acceleration sensor occurs when the general driving situations include vehicle travelling in a straight line.

37. The process according to claim 36, further including the step of detecting travel in a straight line when the steering angle is equal to zero.

38. The process according to claim 37, including the step of comparing a first time change of the acceleration determined by the at least one further device, in the direction corresponding to the longitudinal direction of the vehicle with a second time change of the acceleration to be measured in the defined direction, and deriving a criterion for the driving state of travelling on a bend when at least one of the two time changes is not equal to zero, by forming, during accelerated travelling in a straight line, a quotient of the first time change and the second time change, and by comparing the quotient with an instantaneous quotient constituted by an instantaneous value of the second time change, and concluding that there is travel on a bend when the instantaneous quotient is equal to the quotient of the first time change and second time change, and that there is travel in a straight line when the instantaneous quotient is not equal to the quotient.

39. The process according to claim 31, wherein the step of conducting the functional check of the acceleration sensor occurs when the general driving situations include vehicle travelling in a straight line.

40. The process according to claim 39, including the step of rotating the defined direction of the accelerations to be measured by the acceleration sensor through an angle of about 30° out of the direction transverse relative to the longitudinal direction of the vehicle toward of the longitudinal axis of the vehicle.

41. The process according to claim 40, wherein the at least one further device for the determination of the acceleration of the vehicle in the direction corresponding to the longitudinal direction of the vehicle is operatively configured in such that the acceleration in the at-least-one-further-device determined direction is determined from the speeds of at least one vehicle wheel.

42. The process according to claim 39, further including the step of detecting travel in a straight line when a steering angle is equal to zero.

43. The process according to claim 39, including the step of comparing a first time change of the acceleration determined by the at least one further device, in the direction corresponding to the longitudinal direction of the vehicle with a second time change of the acceleration to be measured in the defined direction, and deriving a criterion for the driving state of travelling on a bend when at least one of the two time changes is not equal to zero, by forming, during accelerated travelling in a straight line, a quotient of the first time change and the second time change, and by comparing the quotient with an instantaneous quotient constituted by an instantaneous value of the second time change, and concluding that there is travel on a bend when the instantaneous quotient is equal to the quotient of the first time change and second time change, and that there is travel in a straight line when the instantaneous quotient is not equal to the quotient.

44. The process according to claim 43, further including the step of detecting travel in a straight line when the steering angle is equal to zero.

* * * * *